United States Patent [19]
Montferme
[11] Patent Number: 4,460,212
[45] Date of Patent: Jul. 17, 1984

[54] PINCERS-TYPE GRIPPER FOR SEIZING OBJECTS AND GRIPPING HEAD EQUIPPED WITH SUCH GRIPPERS

[75] Inventor: Daniel Montferme, Vernouillet, France

[73] Assignee: E. P. REMY et Cie, Dreux, France

[21] Appl. No.: 340,872

[22] Filed: Jan. 19, 1982

[30] Foreign Application Priority Data

Oct. 8, 1981 [FR] France ..... 81 18955

[51] Int. Cl.³ ..... B25J 15/00
[52] U.S. Cl. ..... 294/115; 294/116
[58] Field of Search ..... 294/86.29, 86.3, 86.31, 294/87 R, 87.22, 87.24, 88, 106, 115, 116

[56] References Cited

U.S. PATENT DOCUMENTS

| | | | |
|---|---|---|---|
| 1,529,513 | 3/1925 | Swan | 294/116 X |
| 1,568,808 | 1/1926 | Davison et al. | 294/115 X |
| 1,733,547 | 10/1929 | Lorenz | 294/116 X |
| 1,738,789 | 12/1929 | Newkirk | 294/115 X |
| 3,108,835 | 10/1963 | Rowekamp | 294/116 X |
| 4,244,618 | 1/1981 | Boyer et al. | 294/116 X |
| 4,395,069 | 7/1983 | Lebret | 294/116 X |

*Primary Examiner*—Johnny D. Cherry
*Attorney, Agent, or Firm*—Kenyon & Kenyon

[57] ABSTRACT

The present invention concerns a pincers-type gripper for bottles, comprising a set of hinged jaws the opening and closing of which are ensured by an operating rod and a pin associated transversely with the rod and loosely inserted or capable of free play in an aperture provided in each jaw and having two internal surfaces contacting the pin, the rod being internally provided with a spring constantly urging the pin to a position in which it bears on one of the internal surfaces of the aperture of the jaws to ensure their positive closing whatever be the extent of the wear or of the plays of the members constituting the gripper.

3 Claims, 2 Drawing Figures

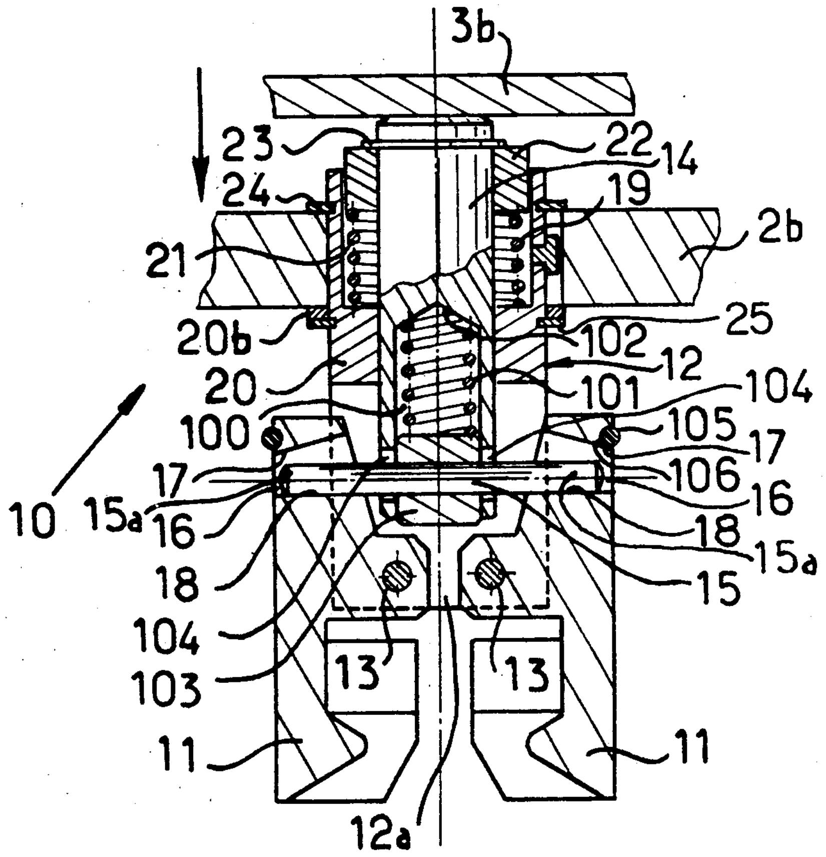

PINCERS-TYPE GRIPPER FOR SEIZING OBJECTS AND GRIPPING HEAD EQUIPPED WITH SUCH GRIPPERS

The present invention concerns a pincers-type gripper member intended for mechanical handling of elongate objects such as for example containers, vessels or receptacles in the form of bottles, flasks or the like having to be, for example, encased or uncased automatically.

Such a pincers-type gripper is of the type comprising essentially a set of hinged jaws the opening and closing of which are ensured by an operating rod with which is associated a transverse pin, stud or the like inserted loosely or having free play in an aperture provided in each jaw and provided with two internal surfaces in contact with said pin, the said surfaces of each aperture forming therebetween such an angle that one of the surfaces is parallel to the axis of the pin in the closed position of the jaws and that the other surface is parallel to the axis of the pin in the open position of the jaws.

This type of pincers-type gripper presents sometimes, in use, failures both upon the seizing of the bottles, i.e. upon the closing of the gripper, and upon releasing the bottles, i.e. upon the opening of the gripper. More precisely, it has been found in particular that the tolerance discrepancies of the members constituting the gripper, as well as the wear and play between such members do not, in the long run, allow obtaining a really positive opening and closing of the pincers-type gripper. Briefly speaking, this means that the jaws constituting the gripper, whether open or closed, always have a certain degree of freedom about their hinge pin, which of course is undesirable. Indeed, the incompletely and non-positively closed or opened jaws may result, in particular, in an untimely release of the previously seized bottles or in making impossible the release of the bottles or flasks once the jaws are opened. It is understood that such a drawback is particularly inconvenient where the containers to be handled are of various shapes and have necks of variable diameters. Moreover, the elongate bottles or objects to be handled are often provided with plugs or caps of various shapes, so that such plugs or caps may stick and remain within the gripper if the opening of the jaws does not take place correctly.

The purpose of the present invention, therefore, is to remedy particularly the aforementioned drawbacks by providing a mechanical pincers-type gripper provided with particular means always allowing the gripper, even after prolonged use, to close and open completely and positively irrespective of the type of containers to be handled for the purpose, for example, of encasing or uncasing said containers.

To this end, the invention has for a subject matter a gripper of the pincers-type defined above and in which the jaw operating rod is internally provided with return means constantly urging the pin or stud to a position in which it bears upon one of the internal surfaces of the aperture of the jaws to ensure a positive closing of the latter irrespective of, in particular, the wear or the play of the members constituting the gripper.

According to a preferred form of embodiment, the said return means is constituted by a spring accommodated in an axial bore opening at the end of the operating rod, the said spring acting upon a block slidingly mounted in the said bore and traversed by the said pin.

According to still another characterizing feature of the invention, the pin associated with the said block and extending throughout the bore of the operating rod has free vertical play in two oblong apertures or holes provided in proximity to the end of the operating rod.

Thus, when the gripper jaws are closed and if there are wears and plays preventing the jaws from closing positively, the spring accommodated in the operating rod will act upon the pin to ensure a positive contact of the latter with the jaws, so that the jaws always remain positively closed.

According to another characterizing feature of the pincers-type gripper of the invention, the upper portion of the jaws is provided with a resilient annular means of constant return of the said jaws to their open position, which means is for example a rubber ring or a toric spring retained in a slot or the like provided in the said jaws.

Therefore, if owing to the wear or the plays of the members constituting the gripper the gripper jaws do not open correctly, i.e., have a certain degree of freedom upon opening, the said rubber ring or spring will always act to ensure a complete and positive opening of the gripper jaws.

The invention is also directed to a head for gripping containers or receptacles such as for example bottles, flasks or the like of various shapes, equipped with a plurality of grippers complying with the aforementioned characterizing features.

Other characterizing features and advantages of the invention will appear more clearly from the following detailed description with reference to the appended drawings given solely by way of example and wherein:

FIG. 1 is an elevational view, in partial vertical section, of a gripper in closed position, and FIG. 2 is a view identical with FIG. 1 but showing the gripper in the open position.

Referring to the Figures, it is seen that the gripper 10 comprises two jaws 11 hinged at 13 to a stationary support 12 and the opening and closing of which are performed by means of an operating rod 14.

In proximity to the end of the operating rod 14 is provided a transverse pin or stud 15 whose ends 15*a* are inserted loosely or with free play in an aperture 16 provided in the upper portion of each jaw 11. Each aperture 16 has such an internal profile as to present two inner surfaces 17, 18 in contact with the ends 15*a* of the pin 15. The inner surfaces 17, 18 are not parallel, i.e., they are arranged at a certain angle from one another to allow the opening and closing of the jaws 11 under the action of the operating rod 14.

The rod 14 extends slidingly throughout the stationary support 12 and is permanently urged by a spring 19 towards an upper position corresponding to the open position of the jaws 11. The latter are hinged at 13 by means of pins, studs or the like extending through a clevis 12*a* forming the lower end of the stationary support 12 of the gripper 10. It should be noted, in this connection, that the stationary support 12 is fastened to the frame of a gripping head (not shown), more precisely to a plate 2*b* of the said stationary frame. The stationary support 12 includes an upper portion 20 with a cavity 21 in which is accommodated the spring 19 arranged between and bearing upon the bottom of the cavity 21 and a ring, washer or the like 22 retained by a circlip 23 on the rod 14, whereas another circlip 24 maintains the gripper 10 connected to the plate 2*b* of the frame. Furthermore, it is seen that the upper portion 20 of the support 12 of the gripper bears through the medium of a ring, washer or the like 20*b* against the said plate 2*b* and is retained on the latter by the circlip 25.

The gripping head supporting the pincers-type gripper 10 comprises a stationary frame including the plate 2*b*, as well as a frame which is movable within the stationary frame and comprises particularly a vertically movable plate 3*b* intended to actuate the rod 14 for operating the jaws 11. More precisely, and as seen in FIG. 1, the plate 3*b* is adapted to push the rod 14 against the action of the spring 19 so as to actuate the pin 15 and close the jaws 11, whereas when the plate 3*b* is released, the rod 14, under the action of the spring 19, rises and opens the jaws 11, as is seen in FIG. 2. The closing and opening of the jaws is due to the fact that the surfaces 17 and 18 of each aperture 16 of the jaws 11 are arranged at such an angle with respect to one another that one (18) of the said surfaces is parallel to the axis of the pin 15 in the closed position of the jaws (FIG. 1) and that the other surface (17) is parallel to the axis of the pin 15 in the open position of the jaws (FIG. 2).

The mechanical parts of the gripper, however, are subjected to wear in operation, and in the long run, the surfaces 17 and 18 may display hollows due to their repeated contact with the pin 15. Moreover, the plate 3*b* may have unevenness defects and also become worn as a result of its multiple contacts with the operating rod 14. Of course, all those defects result in plays between the members of the gripper, which plays hinder the complete and positive closing or opening of the jaws after a prolonged use of the gripper, which evidently is the purpose sought for.

In order to remedy particularly this situation, there is provided in the operating rod 14 an axial bore 100 in which is accommodated a spring 101 constantly urging the pin 15 to a position in which it bears against the contact surfaces 18 when the jaws 11 are closed as a result of the actuation of the plate 3*b*.

More precisely, the spring 101 bears by one of its ends on the bottom 102 of the bore 100, whereas its other end acts upon a block or the like 103 slidingly mounted in the bore 100 and traversed by the pin 15. The latter, as seen clearly in the Figures, extends throughout the operating rod 14 and is capable of free vertical play in two oblong, diametrically opposite apertures or holes 104 provided in proximity to the hollow end of the operating rod 14.

Thus, when the gripper 10 is closed as seen in FIG. 1, the spring 101 permanently presses the pin 15 against the contact surfaces 18 whatever the extent of the wear or hollows present at these surfaces and which otherwise would impart to the jaws 11 a certain degree of freedom about their hinge pins 13, which would not allow correctly seizing the bottles should the latter exhibit for example irregularities at their necks. It will be noted here that the oblong holes 104 have sufficient vertical dimensions to allow the pin 15 urged by the spring 101 to take up the aforesaid wear or plays.

The present invention also provides for an additional means allowing the jaws 11 to be constantly urged towards their open position. This means is constituted by a ring 105 of, for example, rubber, or by an equivalent means such as a toric spring provided at the upper portion of the jaws 11. The ring 105 is accommodated in a slot 106 provided in the upper portion of the jaws 11. Thus, in the case of wear of the upper contact surfaces 17 of each aperture 16 of the jaws 11, the resilient ring 105 always maintains the jaws 11 in fully open position and prevents them from reclosing by gravity into contact with the pin 15. Otherwise stated, the resilient ring 105 takes over, in a way, from the spring 19 the function of lifting the operating rod 14 into abutment against the plate 3*b* actuated by a rotating ratchet and lever gear of a type known per se and imparting to the plate 3*b* a movement resulting in a necessarily limited travel.

It results from the foregoing that the improvements according to the present invention allow, on the closing and the opening, respectively, of the gripper 10, a compensation or a taking up of the plays resulting for example from the wear of the members in mutual contact, from the surface unevenness of the actuating plate 3*b* whose travel in one direction or the other is necessarily limited, and generally from the tolerance discrepancies between the various parts constituting the gripper.

There is therefore obtained, according to the present invention, a pincers-type gripper whose reliability is always excellent even after prolonged use and which moreover allows encasing or uncasing bottles or flasks which may be either round or oval in shape, whose necks may have a variable diameter and which also may be provided with closing means of variable shape, without there being any risk of such means being blocked or getting stuck within the gripper thus hindering the normal operation of the grippers which, as is known, are grouped on a same gripping head to allow the handling of a more or less important group of bottles.

What is claimed is:

1. A gripper for seizing elongate objects such as bottles, the gripper comprising:

support means having an operating axis;

a set of jaws hingedly mounted on said support means, each jaw being rotatable between an open position and a shut position about a respective pivot axis spaced from and lying in a plane perpendicular to said operating axis;

an operating rod slidably disposed in said support means coaxial with said operating axis, said operating rod having a first end portion extending between said jaws and a second end portion;

a block slidably connected to said operating rod for limited axial movement with respect to the operating rod;

an actuating member fixed to the block and extending transversely to said rod, each of said jaws having an aperture loosely receiving said actuating member, the actuating member having two lateral contact surfaces parallel to each other, and the aperture of each jaw having a planar opening cam surface and an opposed planar closing cam surface, said cam surfaces being nonparallel and extending at an angle such that said opening cam surface is parallel to the contact surfaces of the actuating member when the jaws are in the open position and said closing cam surface is parallel to the contact surfaces of the actuating member when the jaws are in the shut position;

means for slidably moving the operating rod with respect to the support means between a first position in which one of the lateral contact surfaces of the actuating member bears against the opening cam surface of each jaw to a second position in which the other of the lateral contact surfaces bears against the opposed closing cam surface; and a spring internally disposed in said operating rod for resiliently urging the block and actuating member relative to the operating rod toward the closing cam surface of each jaw to assure positive closing of said jaws when the operating rod is in said second position with respect to the support means despite wear of and play between the parts of the gripper.

2. A pincers-type gripper according to claim 1 wherein the actuating member comprises a pin transversely mounted in said block and extending through oblong apertures adjacent the one end of the rod, said oblong apertures defining the limits of motion of the pin with respect to the operating rod.

3. A pincers-type gripper according to claim 1 wherein each jaw includes a portion disposed on the other side of the plane of the pivot axis of said jaw from the one end of the operating rod, and the gripper further comprises an annular spring means retained in grooves in said portions of the jaws for resiliently urging the jaws to their open position.

* * * * *